Oct. 30, 1951     C. H. PARMELEE     2,573,217
WARE-DRYING APPARATUS
Filed April 30, 1947     9 Sheets-Sheet 1

Oct. 30, 1951 C. H. PARMELEE 2,573,217
WARE-DRYING APPARATUS
Filed April 30, 1947 9 Sheets-Sheet 2

Fig_2_

INVENTOR.
Clifford H. Parmelee
BY
Bodell & Thompson
ATTORNEYS

Oct. 30, 1951     C. H. PARMELEE     2,573,217
WARE-DRYING APPARATUS

Filed April 30, 1947                              9 Sheets-Sheet 3

INVENTOR.
Clifford H. Parmelee
BY Bodell & Thompson
ATTORNEYS.

Oct. 30, 1951  C. H. PARMELEE  2,573,217
WARE-DRYING APPARATUS
Filed April 30, 1947  9 Sheets-Sheet 5

INVENTOR.
Clifford H. Parmelee
BY
Bodell & Thompson
ATTORNEYS.

Oct. 30, 1951  C. H. PARMELEE  2,573,217
WARE-DRYING APPARATUS
Filed April 30, 1947  9 Sheets-Sheet 6

INVENTOR:
Clifford H. Parmelee,
BY
Bodell & Thompson
ATTORNEYS.

Oct. 30, 1951 C. H. PARMELEE 2,573,217
WARE-DRYING APPARATUS
Filed April 30, 1947 9 Sheets-Sheet 7
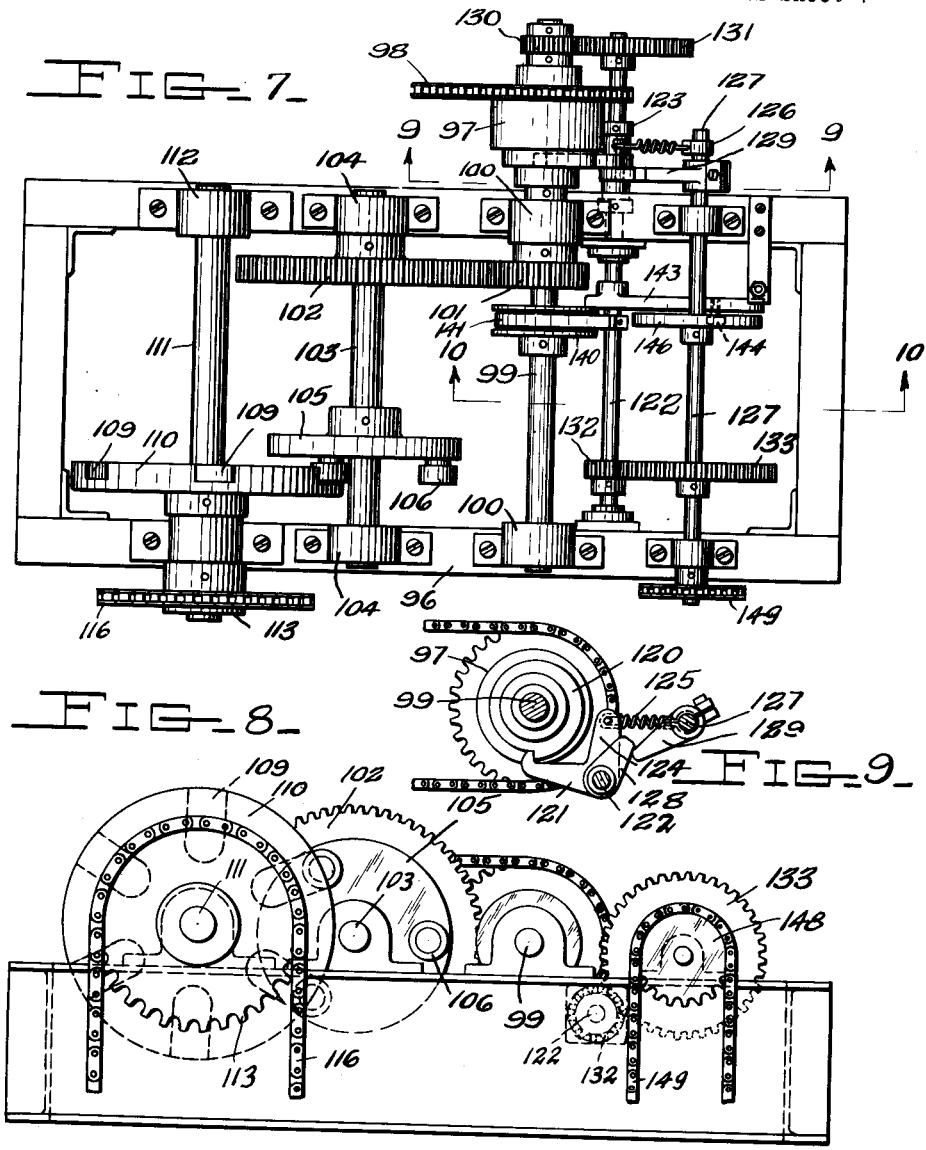
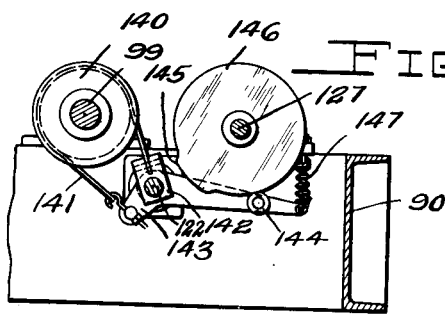
INVENTOR.
Clifford H. Parmelee
BY
Bosdell + Thompson
ATTORNEYS

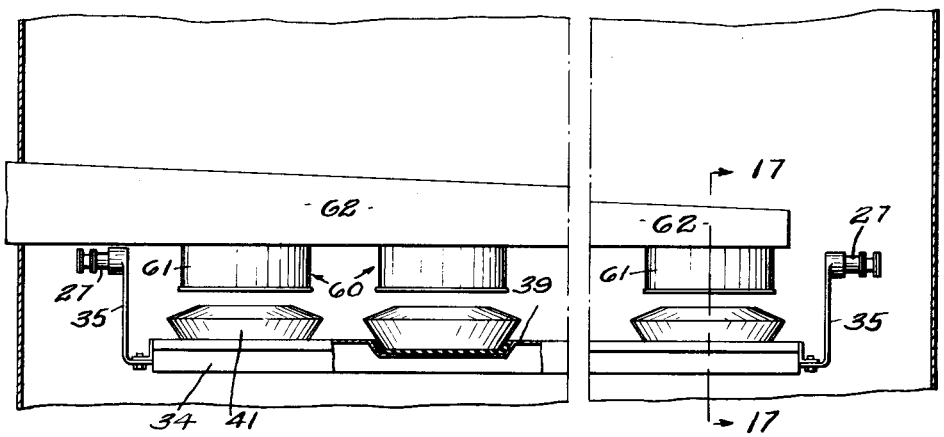
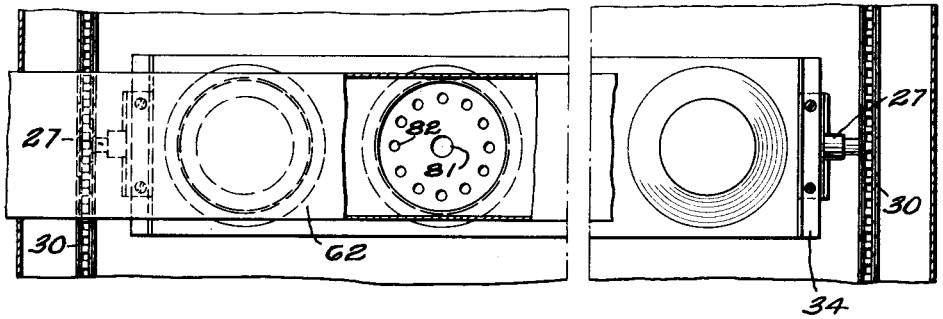
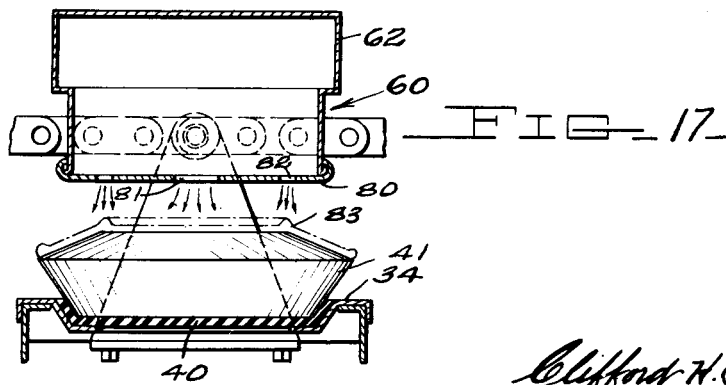

Patented Oct. 30, 1951

2,573,217

UNITED STATES PATENT OFFICE 2,573,217

WARE DRYING APPARATUS

Clifford H. Parmelee, Syracuse, N. Y., assignor to Onondaga Pottery Company, Syracuse, N. Y., a corporation of New York Application April 30, 1947, Serial No. 744,935

3 Claims. (Cl. 34—105)

This invention relates to apparatus for drying pottery ware. The ware is formed from wet plastic clay in or on plaster moulds where it remains until it has dried sufficiently to permit it to be removed from the moulds and handled for subsequent operations. The present procedure in the larger manufacturing plants is to place the moulds with the wet plastic ware thereon on a continuously moving conveyor which advances the moulds through an oven, or cabinet. The cabinet is provided with an inlet opening for heated air, and an outlet opening for the discharge or removal of the air after it has taken up moisture from the ware.

This apparatus, from a production standpoint, is an improvement over the old system of moving the moulds with the ware thereon into a heated room, or chamber, and permitting them to remain there until the ware is dried. However, the conveyor type drier now in use is, relatively speaking, a structure of enormous size. In order to remove the relatively great amount of moisture from the ware and do so with uniform drying, the conveyor has to be of great length and accordingly the cabinet or oven, in which it is mounted, has to be of large dimensions.

Furthermore, due to the extended time that it is necessary to effect proper drying of the ware, a large number of moulds must be used to produce a relatively small output of ware. For example, if the jiggerman produces 500 pieces of ware per hour, and it requires two hours for the drying operation, it is necessary to have 1000 moulds in order to produce 500 pieces of ware per hour. Accordingly, the conveyor has to be constructed to accommodate 1000 moulds and correspondingly, the cabinet has to be constructed large enough to take the conveyor. On the other hand, if the drying time can be reduced to thirty minutes, it is only necessary to have 250 moulds in use and accordingly, the drying apparatus need be only one-quarter as large as in the conventional operation.

This invention has as an object, apparatus for drying pottery ware embodying an arrangement by which the time required for drying the ware is very materially reduced and therefore, materially reducing the size, cost and maintenance, of the drying apparatus and materially reducing the number of plaster moulds required to maintain a predetermined output.

The invention has as a further object, a ware drying apparatus embodying a structure whereby the ware is dried uniformly, thus avoiding warping of the ware and the cracking thereof in subsequent firing.

The invention consists in the novel features and in the combinations and constructions hereinafter set forth and claimed.

In describing this invention, reference is had to the accompanying drawings in which like characters designate corresponding parts in all the views.

Figure 7 is a top plan view of the drive mechanism.

Figure 8 is a side elevational view of the drive mechanism shown in Figure 7.

Figure 9 is a view taken on line 9—9, Figure 7.

Figure 10 is a view taken on line 10—10, Figure 7.

Figure 14 is a sectional view taken on line 14—14, Figure 2.

Figure 15 is a side elevational view, partly in section, of a flatware mould carrier shown in Figures 4 and 6, and of the hot air distribution duct.

Figure 16 is a top plan view of the structure shown in Figure 15, with parts broken away.

Figure 17 is a view taken on line 17—17, Figure 15.

Figure 1:
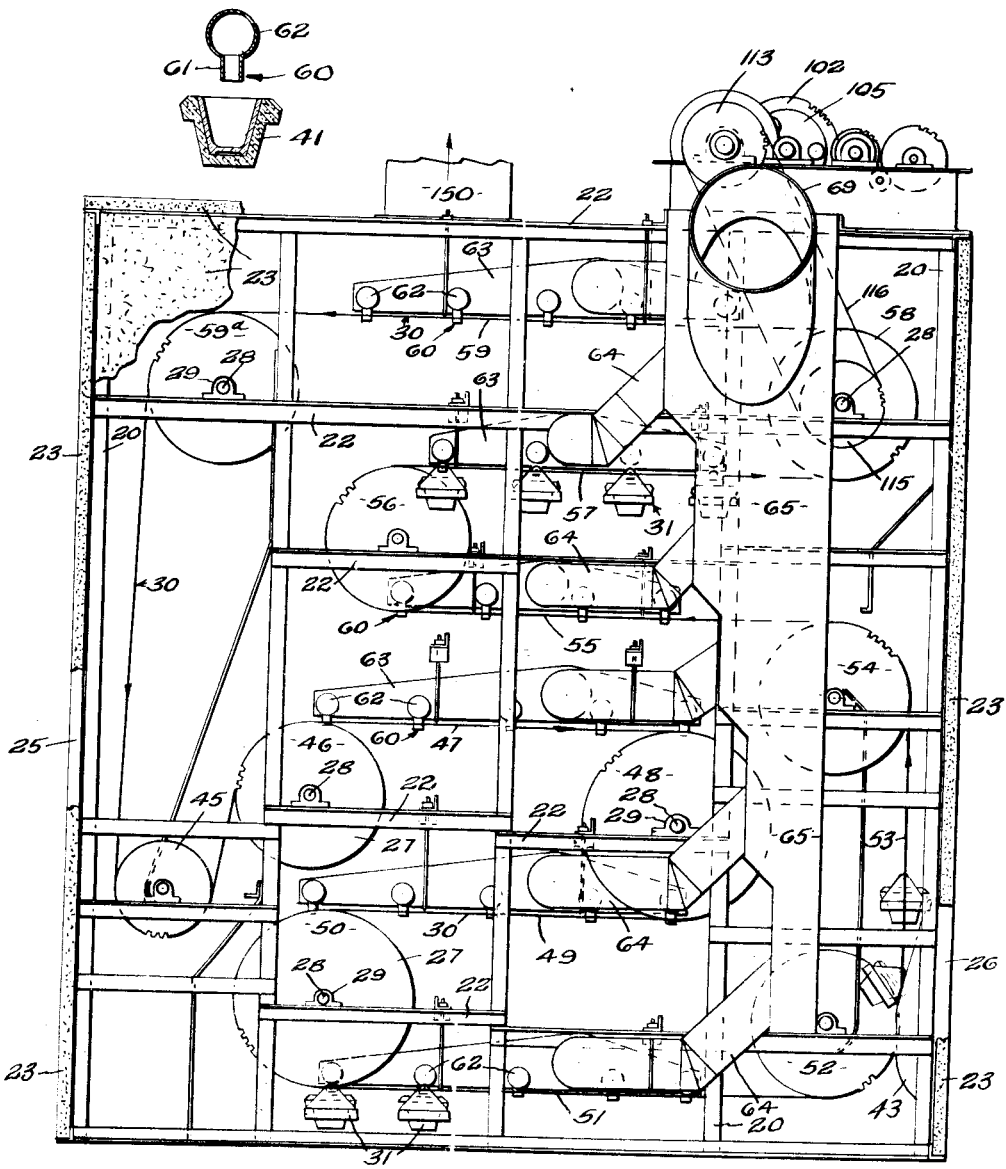
Figure 1 is a side elevational view of a ware drying apparatus embodying my invention, with the major portion of the side wall of the drying cabinet removed.

In general, the invention consists of a suitable cabinet in which are arranged a plurality of individual concentrated heat zones along an elongated path, a conveyor for advancing a procession of moulds having ware thereon along said path, and means operable to intermittently actuate the conveyor to cause rapid movement of the moulds from one heat zone to the next, and to cause the moulds to dwell in the heat zone for a substantial period of time.

The invention further contemplates a structure by which the heat in the heated zones is directed directly onto the ware by such an arrangement and in such a manner that the moisture is withdrawn from the ware uniformly throughout the ware.

The cabinet is built around a suitable frame structure consisting of a plurality of upright members 20, to which are fastened cross members 21 and lengthwise extending members 22. The framework is of rectangular form and is covered exteriorly with sheet insulating material 23. The cabinet, formed by the framework 20, 21, 22, and the sheet covering 23, is formed with an opening 25 in one end constituting a loading station where the dried moulds are removed from the carriers, and moulds with freshly made ware are placed on the mould carriers. On the opposite end of the machine, the cabinet is provided with an opening 26 forming a discharge station where the dry ware is removed from the moulds.

A plurality of sprockets designated generally 27 are mounted in spaced apart relation in pairs on shafts 28. The shafts 28 are journalled in bearings 29 mounted upon the supporting members 22, with the shafts 28 extending transversely across the cabinet. Chains 30 are trained over the sprockets 27 and, at spaced intervals, mould carriers designated generally at 31 are attached to the chains. These mould carriers are constructed to receive hollow ware moulds, or flat ware moulds. The hollow ware moulds are illustrated in detail in Figures 11 to 14. They consist of a rectangular frame 34 having an upwardly extending bracket 35 secured to each end and apertured as at 36 to receive a trunnion pin 37 projecting from a chain link 38. Thus, the carriers extend from one chain transversely across the cabinet to the other, as illustrated in Figures 2 and 6.

A plate 39 of wood, or other material, is arranged in the rectangular framework and is formed with a plurality of circular mould receiving apertures spaced apart lengthwise of the carrier. Preferably, an annular member 40 of resilient material is arranged in each aperture for resiliently supporting the mould 41.

Figure 2:
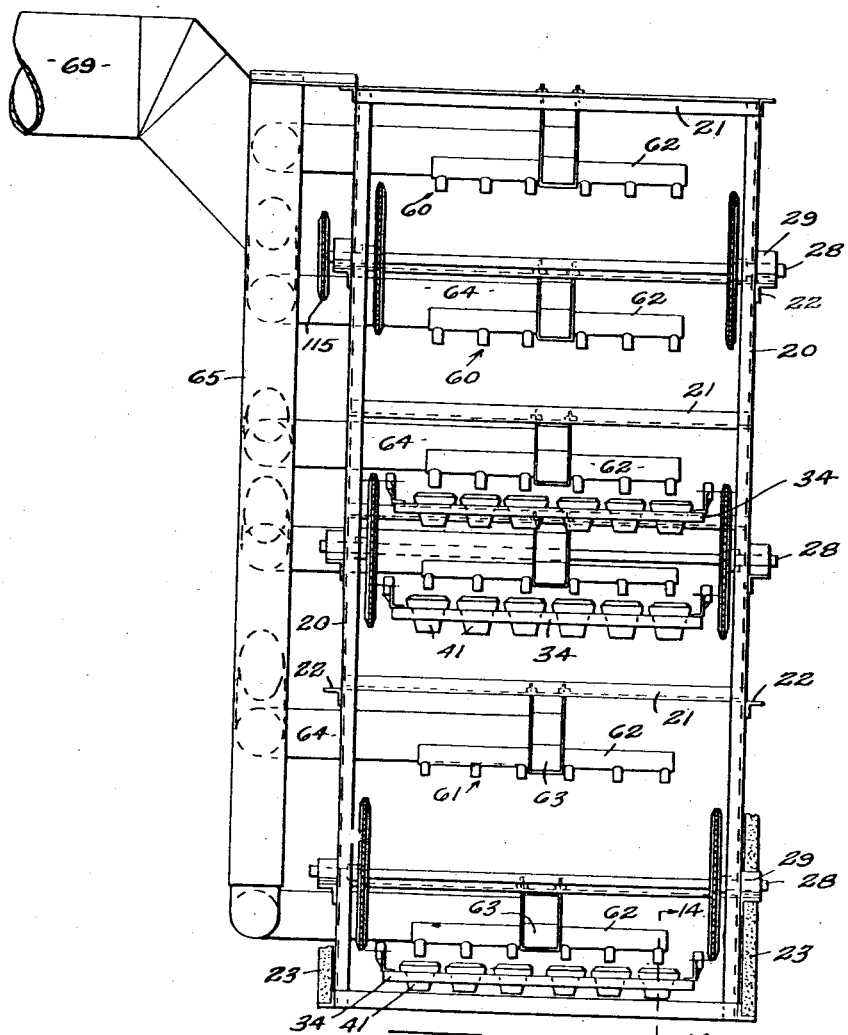
Figure 2 is an end elevation of the discharge end of the apparatus with the end wall of the cabinet and parts removed, the view looking to the left, Figure 1.
Figure 3:
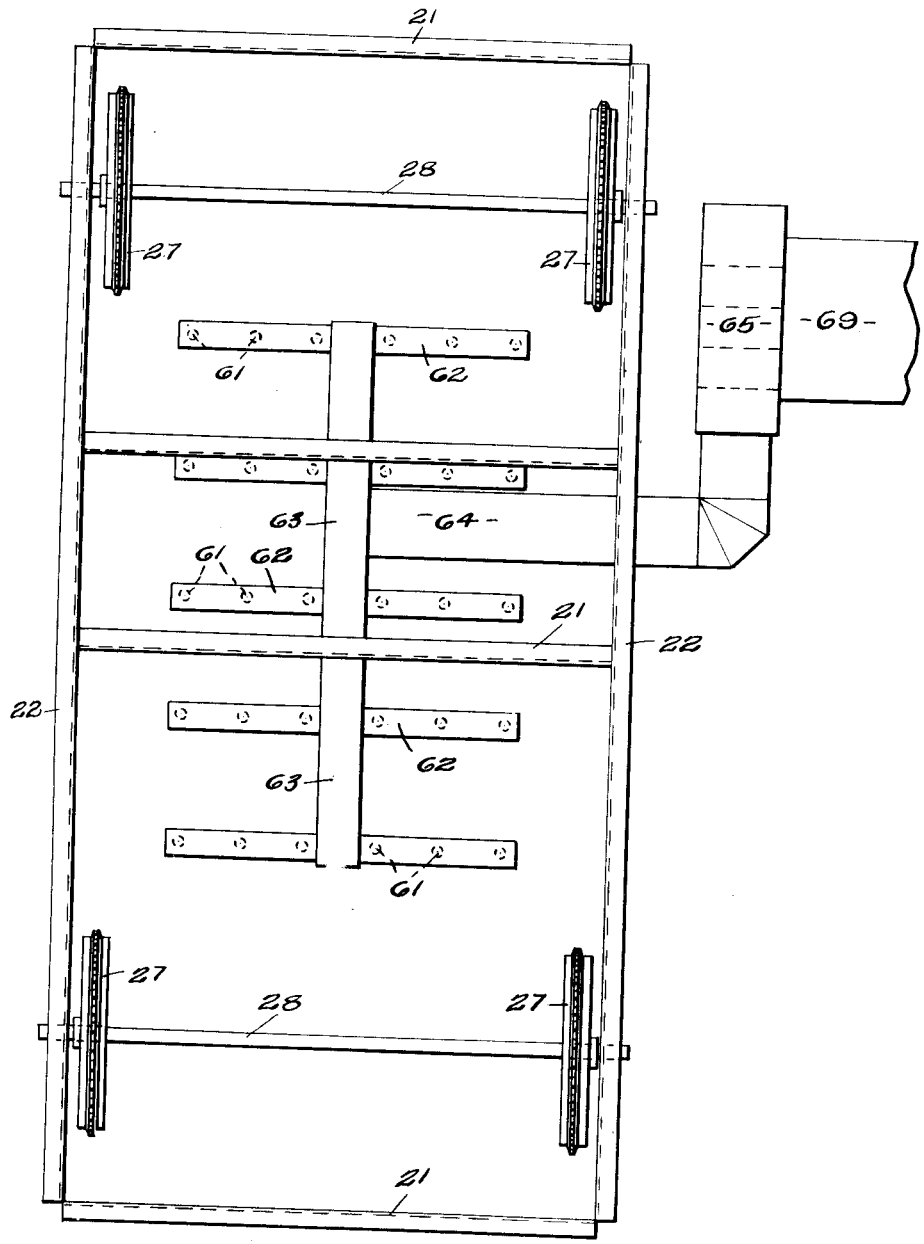
Figure 3 is a top plan view of the structure shown in Figures 1 and 2, with parts omitted.
Figure 6:
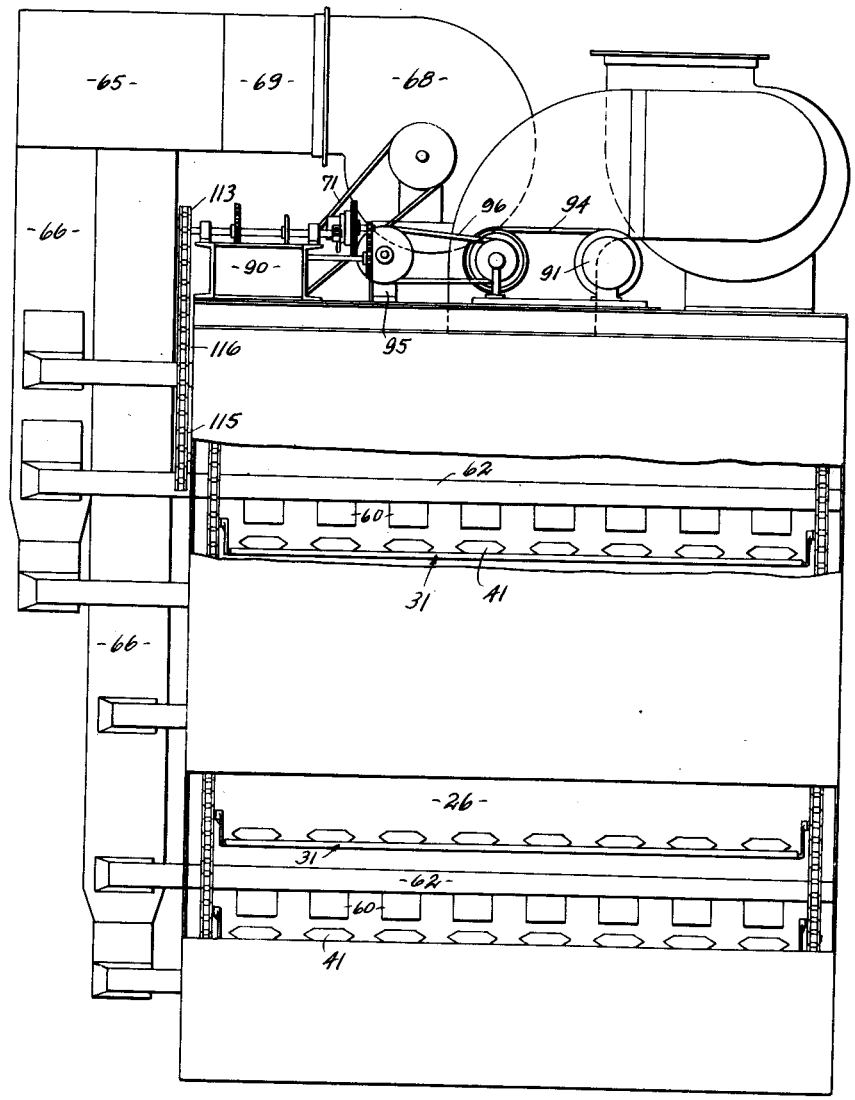
Figure 6 is an end elevational view looking to the left, Figure 4, with parts broken away.
Figure 13:
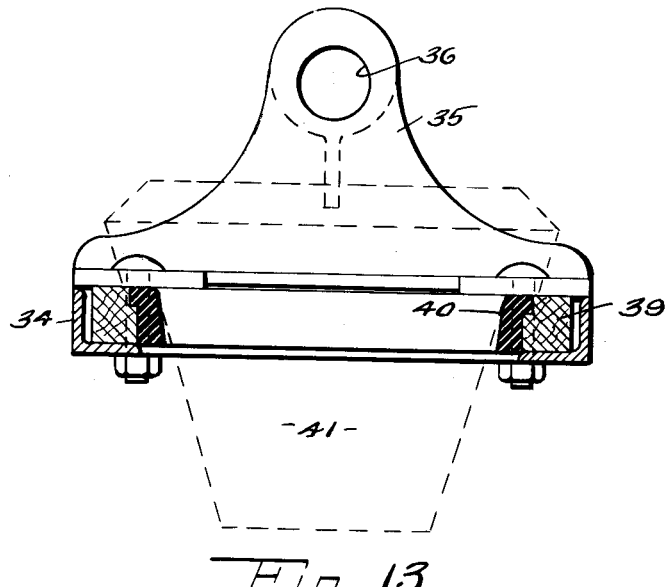
Figure 13 is a sectional view taken on line 13—13, Figure 12.
Figure 12:
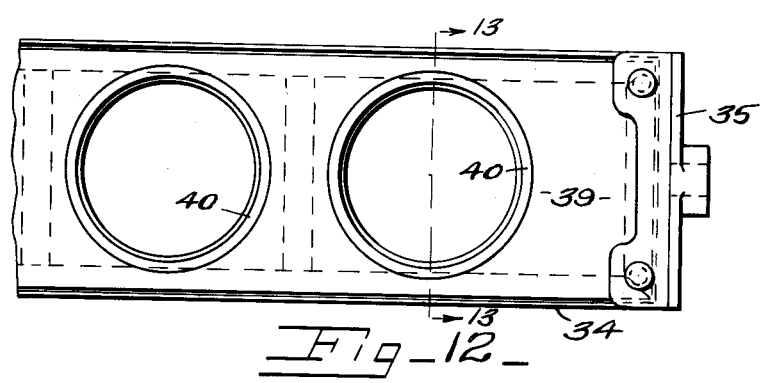
Figure 12 is a top plan view of the structure shown in Figure 11.
Figure 11:
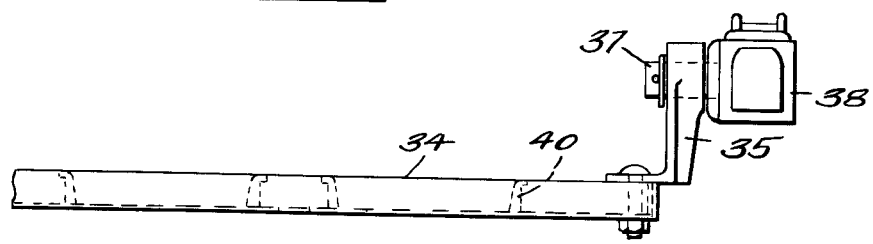
Figure 11 is an enlarged elevational view of a portion of one of the hollow ware mould carriers shown in Figures 1 and 2.

In the arrangement shown in Figure 2, the carriers are adapted to carry six hollow ware moulds, and in Figure 6 to carry eight flatware moulds, the number of moulds depending upon the diameter of the moulds and the spacing between the sprockets 27. The arrangement is such that the carriers hang and swing pendant fashion from the conveyor chains, whereby the moulds are maintained in horizontal position while moving on the vertical or horizontal runs of the conveyor chain and while dwelling in the heat zones. In the case of the hollow ware, the mould carriers 31 may be tilted in the dwell position at the unloading station 26 by a curved tilting guide 43, lower right Figure 1. The carriers for the flatware moulds are of similar construction and are illustrated in Figures 15 to 17.

In this case, the plate 34 may be formed of sheet metal with circular depressions to receive the moulds 41 which are also preferably supported or seated upon a mat 40 of resilient material.

The shafts 28, carrying the conveyor chain sprockets 27, are so arranged and journalled in the framework of the cabinet that the moulds travel over an elongated path through the cabinet.

Figure 4:
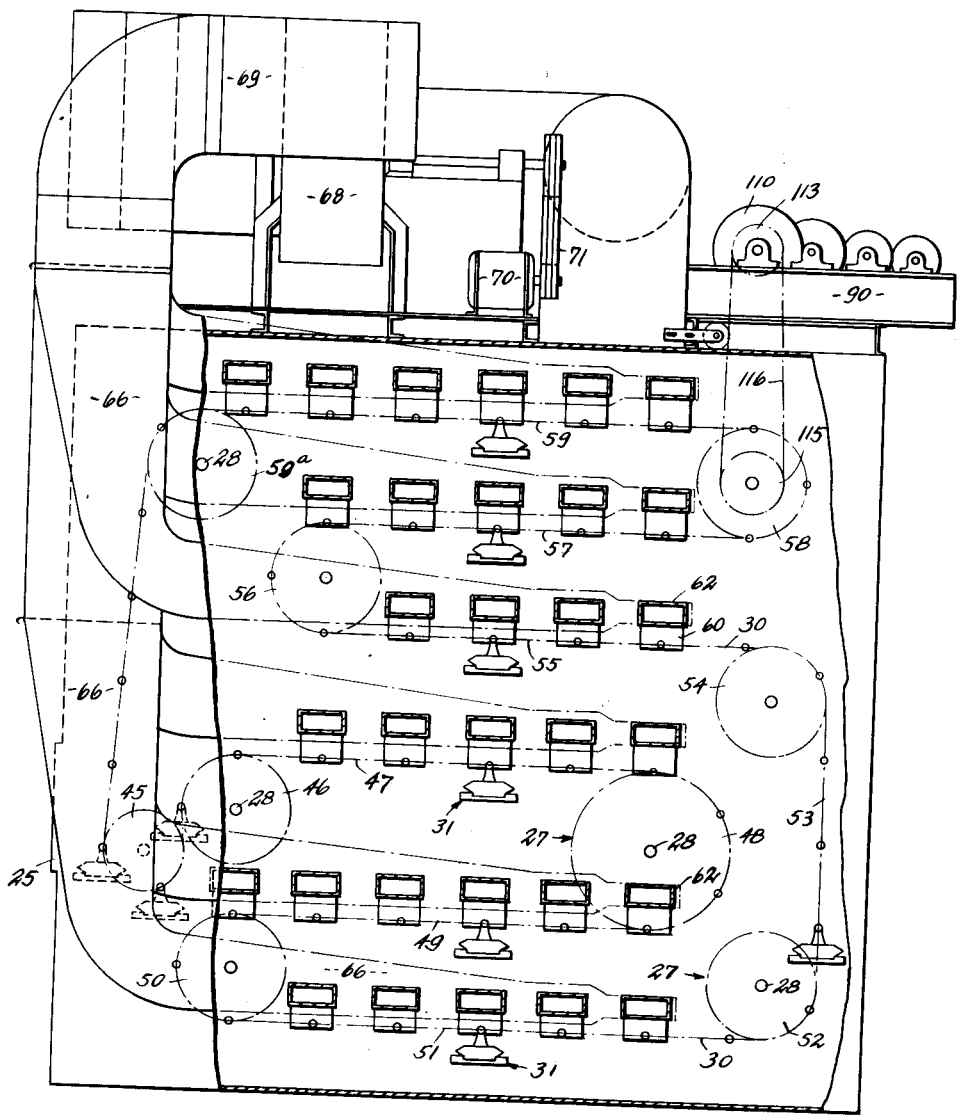
Figure 4 is a side elevational view of a modified form of apparatus with parts shown in section.

In Figures 1 and 4, the moulds move downwardly from the loading station 25, the conveyor chains passing about the sprockets 45, then upwardly over the sprockets 46 along the horizontal path 47 downwardly around sprockets 48 along a horizontal path 49, downwardly around sprockets 50, along the horizontal path 51, upwardly around sprockets 52 to the unloading station 26. From the unloading station, the moulds move upwardly along the vertical path 53, around sprockets 54, along the horizontal path 55, upwardly around sprockets 56, along horizontal path 57, upwardly around sprockets 58, horizontal path 59, near the top of the oven and downwardly around sprockets 59ᵃ to the loading station. With this arrangement the conveyor, including the sprockets designated generally 27, the chains 30 and carriers 31 advances a procession of moulds from the loading station 25 along the path enumerated and return the moulds to the loading station, the unloading station 26 being located along the path.

Figure 5:
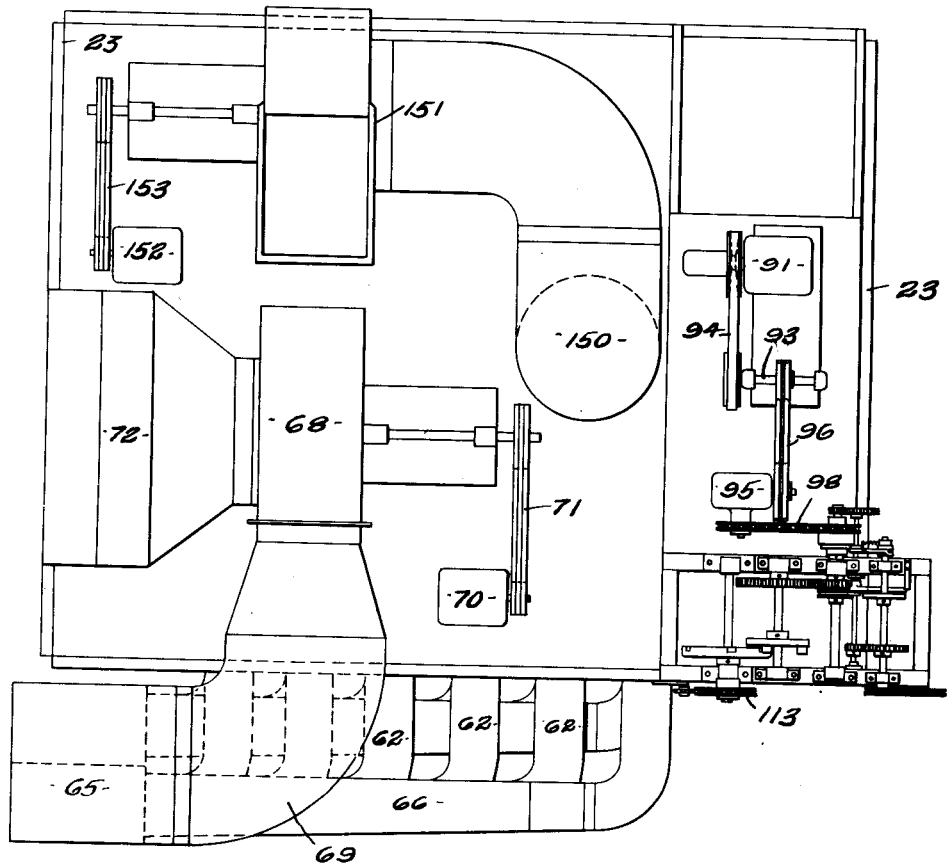
Figure 5 is a top plan view of the structure shown in Figure 4.

As previously stated, the invention contemplates a plurality of individual concentrated heat zones located along the path traveled by the moulds on the carriers 31. In the structure illustrated, the heat zones are established by the discharge of heated air through outlets spaced along and above the path traveled by the moulds. The outlets are designated generally at 60 and consist of a tubular member 61 depending from a duct 62 extending transversely across the cabinet. In Figures 1 and 2, the ducts 62 are connected to headers 63, each of which, in turn, is connected to one end of a duct 64, and at their opposite ends the ducts 64 terminate in a vertically arranged distribution duct 65. In Figures 4, 5 and 6, the transversely extending ducts 62 are carried outwardly through one side of the cabinet and connected directly to the distribution ducts 65 which, in this instance, have laterally extending branches 66.

The upper ends of the distribution duct 65 are connected to a blower 68 through pipe 69 driven by motor 70 through belt 71. The blower and drive therefor are mounted upon the top of the cabinet, and the motor is provided with an intake duct 72 connected to a supply of heated air.

The outlets 60 are positioned along the transversely extending duct 62 so that they are in registration with the moulds 41 advanced by the carriers 31, see Figures 2 and 6. That is, each of the ducts 62 is provided with the same number of outlets as there are moulds being advanced by each carrier. There are a plurality of ducts 62 and they are spaced at uniform intervals along and above the path traveled by the moulds, see Figures 1 and 4.

When the drier is used for drying flatware, each of the depending tubular members 61 is provided with a closure 80. The closures 80 are formed with a relatively large aperture 81 arranged centrally in the closures, see Figures 6 and 17. The closures are also formed with an annular series of smaller apertures 82, this series being spaced from the center of the closures to position the apertures 82 over the foot 83 of the ware. With this arrangement, heated air is impinged directly upon the center of the ware and moves radially outwardly, and an annular discharge of heated air is impinged upon the foot 83 and is directed radially outwardly by the current resulting from the central discharge and moving over the peripheral margin of the ware, thereby rapidly and uniformly extracting the moisture from the ware, whereby it is dried evenly. In the case of the hollow ware, the tubular members are provided with a central aperture 85 which impinges a blast of heated air into the hollow ware and which is directed upwardly along the interior surface of the ware and outwardly.

It will be observed that the unloading station 26 is located approximately midway in the path traveled by the moulds and that there are approximately the same number of outlets 60 to effect drying of the empty moulds as they travel from the unloading station to the loading station through the upper portion of the cabinet.

This arrangement of the individual heat zones for drying the empty moulds is also of importance. It will be understood that the plaster moulds quickly abstract an appreciable amount of moisture from the wet ware when it is placed on or in the moulds and, due to the fact that the wet surface of the mould is covered by the wet plastic clay, substantially no moisture is removed from the mould prior to the removal of the ware from the mould. It is necessary to remove this moisture from the mould before fresh ware is applied thereto. Otherwise, constant reuse of the wet mould will cause the same to become waterlogged and make it unsuitable to form ware on.

In my invention, provision is thus made to also rapidly and uniformly dry the empty moulds whereby they will be available for reuse upon their return to the loading station 25, this being accomplished by causing the moulds to dwell for substantial periods of time in the individual concentrated heat zones in the upper portion of the cabinet. This drying is particularly effective because the time required to dry the ware is of such short duration that the moisture initially abstracted from the ware by the plaster mould has not had an opportunity to penetrate the mould to any great depth and, by subsequently subjecting the moulds to the individual heat zones, that moisture is rapidly and uniformly removed from the moulds.

The conveyor chain 30 is advanced intermittently, the arrangement being such that during the dwell in the movement of the chain and carriers, the moulds are positioned axially beneath the respective outlets 60. As previously stated, the outlets 60 are arranged at uniform intervals along the path over which the moulds are advanced, and the mechanism for actuating the conveyor chain is such that each intermittent movement of the chain advances the moulds successively from one outlet to the next, and the drive mechanism is of such structure that the advancement of the moulds from one outlet to the other is performed rapidly and the dwell of the moulds beneath the outlet is for a substantial period of time.

The drive mechanism for intermittently actuating the conveyor is carried by a structural frame 90 mounted on the top of the cabinet. The drive is operated by a motor 91 connected to a variable speed unit, indicated at 93, by belt 94 which, in turn, is connected to a reducing gear 95 through belts 96. The reducing gear 95 is connected to the driving element 97 of a one revolution clutch through chain 98. The driving element 97 is mounted upon shaft 99 journalled in bearings 100 on the framework 90. A gear 101 is secured to the shaft 99 and meshes with a gear 102 secured to shaft 103 extending parallel with shaft 99 and being journalled in bearings 104. A driving disk 105 is secured to the shaft 103 and provided with a plurality of driving rollers 106 arranged to engage slots 109 in a Geneva disk 110 mounted upon a shaft 111 journalled in bearings 112. The shaft 111 extends outwardly beyond the framework 90 and a sprocket 113 is secured to the projecting portion of the shaft. This sprocket is connected to a driven sprocket 115 mounted upon one of the shafts 28 extending through the side wall of the cabinet by chain 116.

The clutch contained within the driving member 97 is provided with a combination stop and throw-out member 120 formed with a shoulder to be engaged by a latch 121 pivotally mounted on a shaft 122 between collars 123. The latch 121 is provided with an arm 124 to which is connected a tension spring 125, the opposite end of the spring being fixed to a collar 126 freely mounted upon a shaft 127. The latch 121 is also provided with an arm 128 arranged to be engaged by an arm 129 fixedly secured to the shaft 127 and rotatable therewith. The construction and operation of this clutch is described in further detail in Patent No. 2,140,737.

It will be apparent from Figure 9 that the spring 125 functions to hold the latch 121 into engagement with the shoulder on the stop member 120 of the clutch. With the parts in this position, the clutch is disengaged and no power is transmitted from the member 97 to the shaft 99.

The member 97 has associated with it a gear 130 meshing with a gear 131 mounted upon the shaft 122, whereby the shaft 122 is rotated continuously and effects continuous rotation of the shaft 127 through gears 132, 133. The gear 133 is larger than the gear 132 and accordingly, the shaft 127 rotates slower than the shaft 122.

Any desired ratio between the shafts 122, 127 may be employed which will effect a rapid movement of the conveyor and a relatively long dwell period. In actual practise, it has been found satisfactory to have the ratio such that the shaft 127 rotates one revolution while the shaft 122 rotates twelve revolutions. Upon each revolution of the shaft 127 and accordingly, the arm 129, the latch 121 is tripped out of engagement with the member 120, permitting the clutch to engage and the shaft 99 to be rotated in unison with the member 97. This disengagement of the latch is only momentarily, as will be apparent. The latch then rides on the member 97 and when the same has made one revolution, the shoulder again engages the latch throwing out the clutch and stopping movement of the shaft 99. Accordingly, the shaft 99 is rotated once during each twelve revolutions of the driving clutch member 97. Rotation of the shaft 99 effects rotation of the shaft 103 with the driving disk 105 mounted thereon. The ratio through the gears 101, 102 being such as to effect the desired angular movement of the Geneva disk 110 and shaft 111. This arrangement is such that the conveyor chain 30 is moved sufficiently to advance the moulds from one heated zone into the next. The dwell of the conveyor and accordingly, the moulds in the heated zones takes place during the succeeding eleven revolutions of the clutch member 97. Accordingly, if the clutch member is driven twelve revolutions per minute, the moulds are advanced from one heat zone into the next in a matter of five seconds, and remain in the heat zone a matter of fifty-five seconds. This is of importance because it results in the ware being maintained almost constantly in the heated zones and, during its dwell in the zones, is dried uniformly by the apertured structure of the outlets 60, as previously explained. If the moulds were advanced continuously, the drying would be most un-uniform as portions at opposite sides of the ware would be subjected to the heat for a lesser period of time than the central portion of the ware extending parallel to the path of movement. This because substantially all tableware is of circular form. Accordingly, the ware would be dried unevenly and would have a tendency to warp and to crack in subsequent firing.

The shaft 99 is provided with a brake disk 140 which is encircled by a brake band 141, one end of which is secured to a block 142 mounted on shaft 122 and the opposite end to a bell crank lever 143, one arm of which carries a roller 144 which is engaged by a cam lobe 145 on a cam disk 146 mounted on shaft 127. The lever 143 is urged in a counter-clockwise direction by a tension spring 147, thus contracting the band 141 on the disk 140, and serving to restrain rotation of shaft 99. The band 141 is released by the cam lobe 145 engaging the roller 144, and this is arranged to take place when the clutch is tripped and shaft 99 is rotated. The purpose of this brake structure is to prevent any possibility of over-run by the drive or conveyor after the clutch has been tripped out.

The Geneva drive explained results in the carrier chain being advanced slowly at its initial movement, and being retarded slowly at the end of the movement, thereby reducing the tendency of the pendent carriers 31 from swinging on their pivots during the horizontal runs of the conveyor chain, which would occur at rapid production rates with such other means for driving as ratchet and pawl drive, or interrupted gear drives.

In Figures 7 and 8, the shaft 127 is provided with a sprocket 148 for driving auxiliary apparatus such as mechanism for automatically removing the dry ware from the moulds at the unloading station, this drive being effected through a chain 149.

The moisture laden air is exhausted from the cabinet through a duct 150 mounted in the top wall of the cabinet and connected to an exhaust blower 151 operated by motor 152 through belts 153.

With this arrangement, it will be apparent that the moulds with the ware thereon placed upon the carriers at the loading station 25 are intermittently advanced successively through a plurality of individual heat zones, the movement from one zone to the next being rapid, and the dwell in the zones being for a substantial period of time during which the moisture is rapidly and uniformly abstracted from the ware. Accordingly, when the ware reaches the discharge station 25, it is uniformly dried and in condition to be removed from the moulds. The empty moulds then continue their travel through the upper portion of the cabinet and are dried and ready for use when they reach the loading station. Experience has proven that ware can be uniformly and properly dried with the mechanism described in a fraction of the time now consumed by other types of drying apparatus, and the number of moulds required for a given production very materially reduced in number.

What I claim is:

1. Apparatus for drying articles of pottery ware on absorbent molds and drying empty molds comprising a closed cabinet formed with an open interior, said cabinet having an opening in one side for the removal of empty molds and the loading of molds with pieces of ware therein, there being a second opening in the opposite side of the cabinet for the removal of ware from the molds, a chain conveyor arranged in said cabinet and operable to advance a procession of spaced apart mold carriers along a portion of an endless path from said first opening through the open interior of the cabinet to and past said second opening and thence through the remaining portion in said endless path to said first opening, the major portion of said endless path extending in horizontal runs, each of said carriers adapted to support a plurality of spaced apart molds extending in a row transversely of said path, a plurality of individual hot air outlets fixedly mounted in the open interior of the cabinet above the horizontal runs of said conveyor between said first and second openings for drying ware on the molds and between said second and first openings for drying the molds, said outlets being spaced apart complemental to the spacing of the carriers on said conveyor and to the spacing of the molds on said carriers, conveyor actuating mechanism operable to intermittently advance said conveyor and to cause the same to dwell with the molds positioned in axial registration with said outlets, means for supplying hot air under pressure to said outlets, each of said outlets terminating in close proximity to said molds, and exhaust means connected to said cabinet and operable to remove moisture laden air from about and between the molds and discharge the moisture laden air exteriorly of the cabinet.

2. Apparatus for drying articles of pottery ware as defined in and by claim 1 wherein the pottery ware is hollow and the said outlets are formed with a discharge aperture having an area not exceeding the area of the bottom of the hollow articles.

3. Apparatus for drying articles of pottery ware as defined in and by claim 1 wherein the pottery ware is flat ware and said outlets being formed with a central discharge aperture, and an annular series of discharge apertures arranged concentrically with said central aperture, said annular series of apertures not exceeding the diameter of the molds.

CLIFFORD H. PARMELEE.

REFERENCES CITED

The following references are of record in the file of this patent:

UNITED STATES PATENTS

| Number | Name | Date |
|---|---|---|
| 1,283,242 | McCormick | Oct. 29, 1918 |
| 1,569,191 | Lathrop et al. | Jan. 12, 1926 |
| 1,615,237 | Schwartz | Jan. 25, 1927 |
| 1,839,628 | Williams | Jan. 5, 1932 |
| 1,873,002 | McClatchie | Aug. 23, 1932 |
| 1,890,681 | Hoppe | Dec. 13, 1932 |
| 1,978,829 | Wilkie | Oct. 30, 1934 |
| 2,180,947 | Ball | Nov. 21, 1939 |
| 2,385,962 | Barnett | Oct. 2, 1945 |

FOREIGN PATENTS

| Number | Country | Date |
|---|---|---|
| 565,989 | Great Britain | Dec. 7, 1944 |